No. 788,773. Patented May 2, 1905.

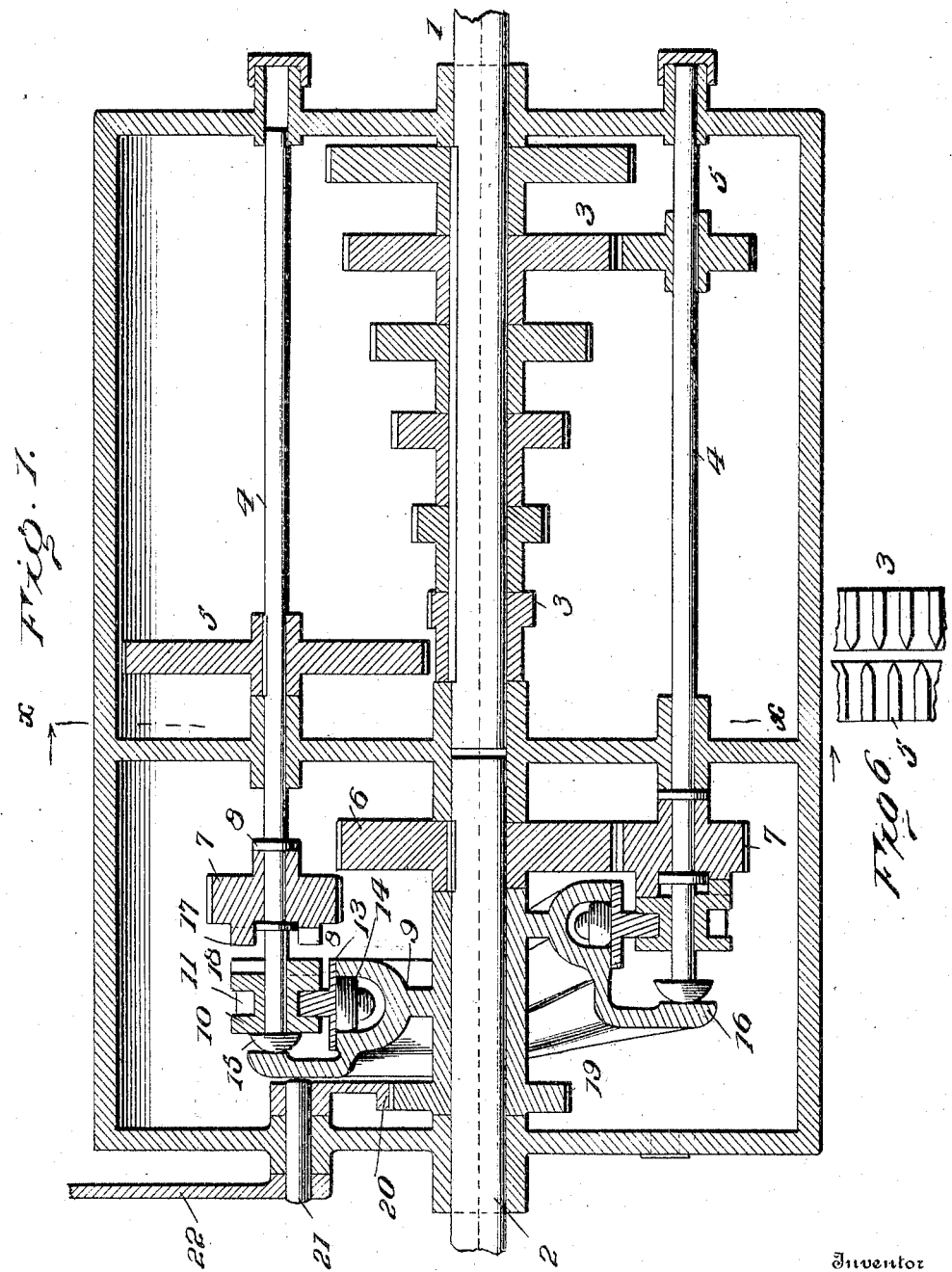

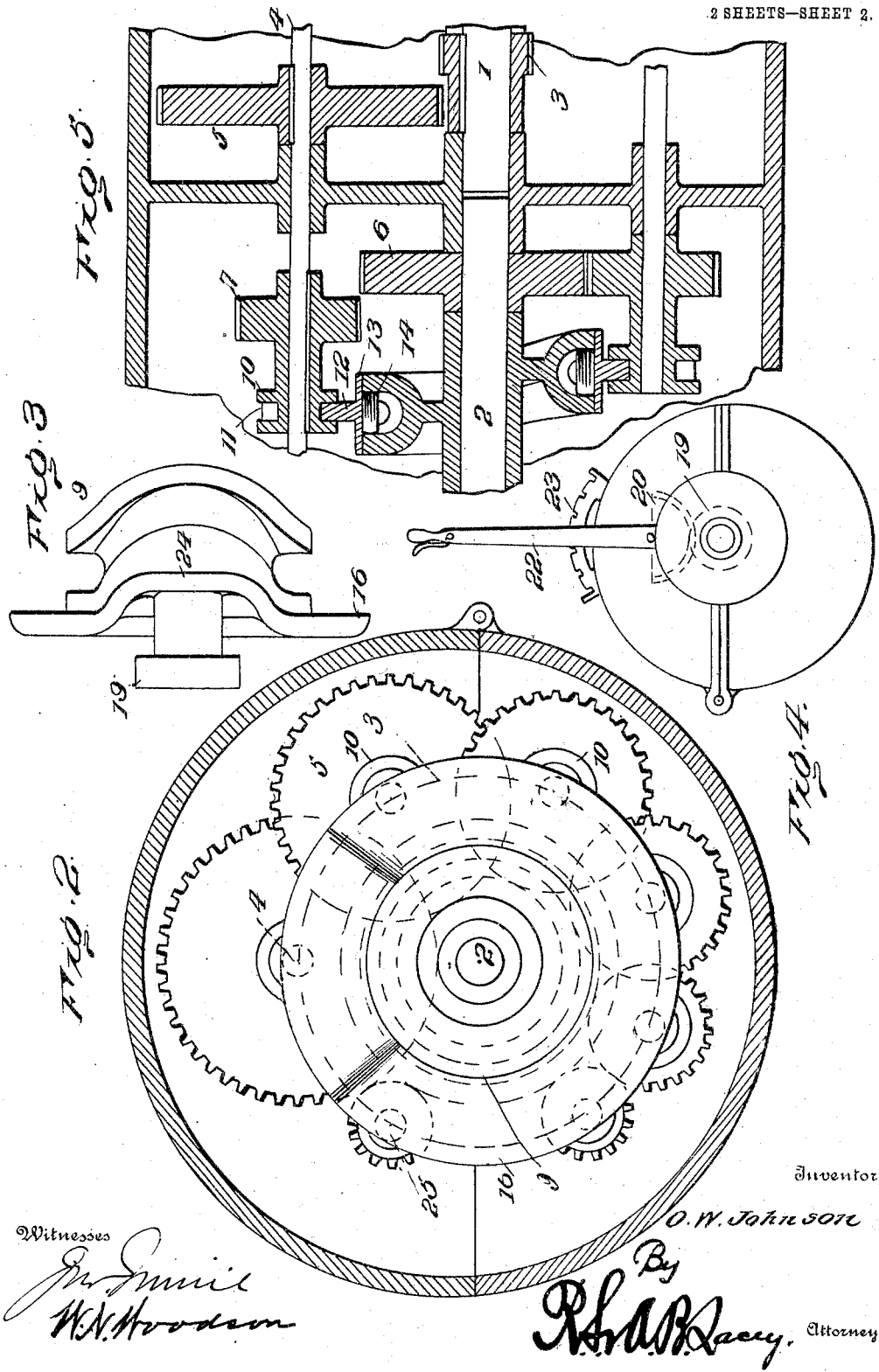

UNITED STATES PATENT OFFICE.

OLIVER W. JOHNSON, OF CLEVELAND, OHIO.

VARIABLE-SPEED GEARING.

SPECIFICATION forming part of Letters Patent No. 788,773, dated May 2, 1905.

Application filed September 1, 1904. Serial No. 223,007.

*To all whom it may concern:*

Be it known that I, OLIVER W. JOHNSON, a citizen of the United States, residing at Cleveland, in the county of Cuyahoga and State of Ohio, have invented certain new and useful Improvements in Variable-Speed Gearings, of which the following is a specification.

The present invention has relation to power-transmitting gearing admitting of varying the speed at will within certain limits and of reversing the motion as may be required.

The mechanism comprises a plurality of gear-trains which are successively thrown into and out of action in moving from a high to a low speed, or vice versa.

One of the principal objects of this invention is to insure full and complete meshing or disengagement of the teeth of the complemental or coöperating gears prior to throwing the load on or off, thereby prolonging the usefulness of the gearing as a whole.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a longitudinal section of a speed-gear constructed in accordance with and embodying the vital features of the invention. Fig. 2 is a transverse section of the speed-gear on the line $x\ x$ of Fig. 1 looking to the right, as indicated by the arrows. Fig. 3 is an edge view of the cam employed for moving the shafts and clutch elements of the speed-gear. Fig. 4 is an end view of the speed-gear, on a smaller scale, showing by dotted lines the means employed for operating the cam to throw the proper gear-train in operation. Fig. 5 is a sectional detail of a modification dispensing with the clutch elements. Fig. 6 is a detail view showing opposing ends of the teeth of complemental gears pointed so as to readily intermesh when throwing such gears into action.

Corresponding and like parts are referred to in the following description and indicated in all the views of the drawings by the same reference characters.

The power-receiving shaft is designated by the reference-numeral 1, and the power-transmitting shaft by the reference-numeral 2. These shafts have a coaxial arrangement and are separated to admit of their running at different relative speeds. The shaft 1 may be driven from any suitable source of power, according to the type of motor or engine employed, and the power-transmitting shaft 2 may be connected in any manner to the machine or other mechanism or part to be operated or driven. The shafts 1 and 2 may be mounted in any manner. A series of gear-wheels 3 are mounted upon the power-receiving shaft 1 and have a progressive arrangement so as to form, in effect, a speed-cone or present a stepped arrangement. These gear-wheels are secured to the shaft, so as to rotate therewith. A series of shafts 4 are grouped about the shafts 1 and 2 and are preferably parallel therewith and equidistant therefrom and are mounted so as to receive both a rotary and a longitudinal movement. Each of the shafts 4 is provided with a gear-wheel 5 of such relative diameter and position as to coöperate with a mating gear-wheel 3 of the shaft 1. Normally the shafts 4 occupy a position to throw the respective complemental gears 3 and 5 out of mesh. The gear-wheels 5 are keyed or otherwise secured to the shafts 4, so as to rotate therewith and impart movement thereto when the mating gears are in mesh. To prevent jamming of the teeth of the complemental gears 3 and 5 when moving the shafts 4 to throw the same into mesh, opposing ends of the teeth are beveled on opposite sides to point the teeth, as indicated most clearly in Fig. 6. As a result the spaces between adjacent teeth at their pointed ends are outwardly flared, thereby facilitating the entrance of the teeth of one gear into the space formed between the teeth of the mating gear when throwing the gear-trains into action.

A master-wheel 6 is keyed or otherwise secured to the shaft 2 for rotation therewith and coöperates with gear-wheels 7, loose upon the shafts 4, but mounted thereon to move longitudinally therewith. As shown, stops 8 are provided on each of the shafts 4 and receive between them the gear-wheel 7. Obviously a longitudinal movement of any one of the shafts 4 causes the gear-wheel 7, mounted thereon, to move therewith either into or out of meshing engagement with the master-wheel 6, according as the shafts 4 are moved inward or outward.

To admit of controlling the longitudinal movement of the shafts 4, suitable appliances are provided, and in accordance with this invention a cam 9 is loosely mounted upon the shaft 2 and coöperating means interposed between said cam and each of the shafts. A collar 10 is mounted upon each of the shafts and is peripherally grooved, as indicated at 11, to receive a pin 12 of a bracket or shoe 13, the latter having a roller 14 to enter the groove of the cam 9, whereby in the turning of the latter the part 13 is moved laterally and effects a corresponding movement of the part 10 and shaft 4. In the construction shown in Fig. 5 the collar 10 is formed with or connected to the gear-wheel 7. Hence the latter and its supporting-shaft 4 move in consonance. In the construction shown in Fig. 1 the collar 10 is loose upon the shaft 4 and is movable toward and from the coöperating gear-wheel 7, a clutch being interposed between the parts 7 and 10 to insure synchronous rotation when the parts 10 and 4 are moved to the limit of their inward travel. It is to be understood that each of the shafts 4 in the construction shown in Fig. 1 is provided with the parts 7 and 10, having independent movement. The part 7 is free to rotate upon the shaft 4 and is movable therewith, whereas the part 10 is secured to the shaft by means of a feather-and-spline connection, so as to rotate therewith, but is free to move toward and from the gear-wheel 7, this being essential to admit throwing the shafts 4 and 2 into and out of gear, as may be required to admit of throwing the load on or off after the gear-wheels 6 and 8 have been either fully in mesh or thrown out of engagement. The outer ends of the shafts 4 are headed, as indicated at 15, said heads constituting stops to limit the relative outward movement of the collars 10 and likewise to receive the impact of a cam extension 16 of the part 9. A half-clutch 17 is provided upon the outer face of the gear-wheel 7, and a corresponding half-clutch 18 is provided upon the inner face of each collar 10, and these parts 17 and 18 constitute component elements or members of a clutch and may be of any accustomed construction so long as provision is had for throwing the parts 7 and 10 into and out of mesh or clutched engagement.

The cam 9 is loosely mounted upon the shaft 2 and is provided with an extension having a gear-wheel 19 normally in mesh with the teeth of a segment 20, secured to the inner end of the shaft 21, an operating-lever 22 being fitted to the outer end of said shaft and provided with a hand-latch for coöperation with the clutch-segment 23 to hold the cam in the required adjusted position. This construction admits of the operating-lever 22 occupying a position exterior to the housing or casing inclosing the working parts of the speed-gear, so as to protect same from dust and foreign matter. The cam 9 has a portion grooved in its periphery for reception of the rollers 14 and the outer extension 16 having a part deflected, as shown at 24, to come in contact with the headed ends of the shafts 4 and move the same inward a distance to bring the gear-wheel 7 in meshing engagement with the master-wheel 6. The deflected portion of the groove of the cam 9 opposite to the deflected portion 24 of the extension 16 is of such relative pitch as to cause independent movement of the collar 10 upon each of the shafts 4 to throw the clutch elements 18 and 17 into or out of engagement after the gear-wheels 6 and 7 have either been thrown into or out of mesh, whereby the load is thrown on or off only after the teeth of the gear-wheels 6 and 7 have been thrown either fully into meshing relation or out of engagement.

For reversing the motion a shaft 25, corresponding to the shafts 4, is provided and is geared to any one of the shafts so as to receive a reverse motion from the shaft 1, so as to drive the shaft 2 in an opposite direction when required. As indicated in Fig. 2, the shaft 25 is geared to the shaft 4 receiving the slowest motion. Hence the mechanism is reversed from the slowest speed, which is of advantage when it is required to quickly reverse a road-machine, such as an automobile or like mechanically-propelled vehicle.

The gear-wheels 3 may be equally spaced upon the shaft 1, as indicated in Fig. 1; but where space is an item of consideration the larger gear-wheels may be brought closer together, particularly where the arrangement is such as to admit of the gear-wheels 5 of the shafts 4 passing the gear-wheels of adjacent shafts 4 when moving the same longitudinally to throw the gear-wheels 3 and 5 into and out of engagement.

In the construction shown in Fig. 5 the shafts 4 are moved longitudinally by means of the cam 9 and the gears 7 and 5 are simultaneously thrown into and out of engagement with the coöperating gears 6 and 3. In the construction shown in Fig. 1 the gear-wheels 5 and 3 and 7 and 6 are fully engaged or disengaged prior to the operation of the clutch to throw the shafts 2 and 4 either into or out of action.

It is to be understood that the power may be applied to the shaft 2 and the machine to be operated connected with the shaft 1, thereby admitting of a higher range of speed from a power that cannot be increased.

Having thus described the invention, what is claimed as new is—

1. In a variable-speed gearing, the combination of power-receiving and power-transmitting shafts, a master-wheel secured to the power-transmitting shaft for rotation therewith, a series of speed-gears secured to the power-receiving shaft to rotate therewith, a plurality of shafts grouped around the aforesaid shafts and mounted for both rotary and longitudinal movement, gear-wheels secured to each of the series of shafts and adapted to be thrown into and out of meshing relation with the master and speed gears by a longitudinal movement of their supporting-shafts, a cam coaxial with the power-transmitting shaft, coöperating means between said cam and the longitudinally-movable shafts to effect an endwise movement of the latter in successive order, and operating means for said cam, substantially as set forth.

2. In a variable-speed gearing, the combination of power-receiving and power-transmitting shafts mounted for independent rotation, speed-gears secured to the power-receiving shaft, a master-wheel secured to the power-transmitting shaft, a series of shafts grouped about the aforementioned shaft and mounted for longitudinal movement, gear-wheels mounted upon each of the series of shafts for coöperation with the master and speed gears, means for imparting a longitudinal movement to the series of shafts in successive order for throwing them into and out of engagement with said power transmitting and receiving shafts, a clutch applied to each shaft of the series for throwing the gear-wheel thereof into and out of operation, and operating means for the clutches to throw them into and out of action after the complemental gears have been either thrown fully into or out of engagement, substantially as set forth.

3. In variable-speed gearing, the combination of power-transmitting and power-receiving shafts mounted to be operated at different relative speeds, speed-gears secured to the power-receiving shaft, a master-gear secured to the power-transmitting shaft, a series of shafts grouped about the aforementioned shafts, complemental speed-gears secured to the series of shafts, other gear-wheels loose upon the series of shafts and adapted to intermesh with the master-wheel and provided with clutch members, collars mounted upon the series of shafts for rotation therewith and movable toward and from the loose gears and having clutch members, and means for moving the series of shafts longitudinally and for throwing the said clutch members either into or out of operation after the speed and loose and master gears have been thrown fully into or out of engagement, substantially as set forth.

4. In variable-speed gearing, the combination of power-transmitting and power-receiving shafts mounted to be operated at different relative speeds, speed-gears secured to the power-receiving shaft, a master-gear secured to the power-transmitting shaft, a series of shafts grouped about the aforementioned shafts, complemental speed-gears secured to the series of shafts, other gear-wheels loose upon the series of shafts and adapted to intermesh with the master-wheel and provided with clutch members, collars mounted upon the series of shafts for rotation therewith and movable toward and from the loose gears and having clutch members, and a cam having two portions, one coöperating with the shafts and the other coöperating with the collars, the parts being disposed to throw the load on or off after the complemental gears have been thrown fully into or out of engagement, substantially as set forth.

5. In variable-speed gearing, the combination of power-transmitting and power-receiving shafts coaxially mounted for rotation at different relative speeds, a master-gear, secured to the transmitting-shaft, speed-gears secured to the power-receiving shaft, a series of shafts grouped about the aforementioned shafts and mounted for longitudinal movement, speed-gears secured to the series of shafts, other gears loose upon the series of shafts and adapted to mesh with the master-gear and provided with clutch members, collars loose upon said series of shafts and mounted to turn therewith and to have independent movement toward and from the gear-wheels, a cam for successively moving the series of shafts longitudinally and independently operating the collars thereof to throw the load on or off after the complemental gears have been thrown fully into or out of mesh, and operating means for said cam, substantially as set forth.

In testimony whereof I affix my signature in presence of two witnesses.

OLIVER W. JOHNSON. [L. S.]

Witnesses:
   H. A. WAUGERELLS,
   H. C. DRESSLER.